（12）United States Patent
Kim et al.

(10) Patent No.: US 8,862,921 B1
(45) Date of Patent: Oct. 14, 2014

(54) APPARATUS FOR REMOTE WAKE-UP DURING DEDICATED CHARGING MODE

(75) Inventors: Sang Hoon Kim, Grayslake, IL (US); Kenneth Helfrich, Duluth, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 99 days.

(21) Appl. No.: 13/310,699

(22) Filed: Dec. 2, 2011

(51) Int. Cl.
*G06F 1/00* (2006.01)
*H02J 7/00* (2006.01)

(52) U.S. Cl.
CPC ... *G08F 1/32* (2013.01); *H02J 7/00* (2013.01); *G06F 2213/3812* (2013.01); *H02J 2007/0062* (2013.01)
USPC ............................................. 713/323

(58) Field of Classification Search
None
See application file for complete search history.

(56) References Cited

U.S. PATENT DOCUMENTS

| | | | |
|---|---|---|---|
| 2008/0313477 A1* | 12/2008 | Numano | 713/321 |
| 2009/0327769 A1* | 12/2009 | Hatano | 713/300 |
| 2010/0088530 A1* | 4/2010 | Cheng et al. | 713/300 |
| 2010/0219790 A1* | 9/2010 | Chadbourne et al. | 320/107 |
| 2011/0157922 A1* | 6/2011 | Konecny et al. | 363/21.12 |
| 2012/0013367 A1* | 1/2012 | Chen et al. | 327/87 |
| 2012/0084592 A1* | 4/2012 | Lin et al. | 713/324 |

OTHER PUBLICATIONS

"USB Host Charger Identification Analog Switch", MAX14450E, Product Literature 19-4745, Rev. 2, Jan. 2010, pp. 1-17.

* cited by examiner

*Primary Examiner* — Thomas Lee
*Assistant Examiner* — Zhipeng Wang
(74) *Attorney, Agent, or Firm* — TIPS Group

(57) ABSTRACT

An apparatus for remote wake-up during dedicated charging mode includes: a USB transceiver port; a USB connector port; a switch network coupling the USB transceiver port to the USB connector port; and control logic coupled to the switch network and operative to control the switch network to disconnect the USB transceiver port from the USB connector port during a dedicated charger operational mode and to connect the USB transceiver port to the USB connector port upon the detection of a potential remote wake-up condition.

11 Claims, 2 Drawing Sheets

APPARATUS FOR REMOTE WAKE-UP DURING DEDICATED CHARGING MODE

CROSS REFERENCE TO RELATED APPLICATIONS

This application is related to U.S. Ser. No. 12/611,745, filed Nov. 3, 2009, the disclosure of which is incorporated herein by reference.

BACKGROUND

The Universal Serial Bus ("USB") was designed to provide a serial communication channel between computers and peripheral devices. For example, USB can connect computer peripherals such as such as mice, keyboards, gamepads, joysticks, scanners, external drives, etc. to a computer. While USB was designed for personal computers it has become commonplace on battery powered computerized devices such as PDAs, music players and cellular telephones which use USB for both data communication and to recharge their batteries. The design of USB is standardized by the USB Implementers Forum (USBIF), an industry standards body incorporating leading companies from the computer and electronics industries.

There are several types of USB connectors approved by the USBIF, including those with four contacts (pins or sockets), such as the USB-A and the USB-B connectors, as well as those with five contacts (pins or sockets), such as the mini/micro-A, mini-micro-B and mini/micro AB. Most computers, including laptop computers, have several USB-A connectors, each of which has a power ($V_{BUS}$) contact, ground (GND) contact and two data line contacts (D+ and D−).

Laptop computers are becoming increasingly popular. In order to preserve battery life, most laptop computers have "inactive" modes where they are not fully on or fully off, such as "sleep", "standby" and certain "hibernate" modes. During operation, such computers are considered to be in their "active" state, and their batteries may last for a number of hours. However, by limiting current draws, the batteries of computers in an "inactive" state can last for days. While the terminology can vary from manufacturer to manufacturer, a standard operating mode for a laptop computer is often referred to as an "S0" state, a "standby" mode is often referred to as an "S3" state, a "hibernate" mode is referred to as an "S4" state, and a "shut-down" mode is referred to as an "S5" state. The S1 and S2 states are throttle-back modes and are usually not apparent to users of a laptop computer.

With some exceptions, laptop computers can charge compliant USB devices that are plugged into a USB connector port of the computer when the computers are in an active or S0 state. In such cases, the laptop computer is considered to be a "USB host." The devices that can be charged through the USB include, but are not limited to, cellular telephones, music players, PDAs etc., collectively referred to herein as "USB devices." The ability to charge USB devices through the same USB connector port used for the transfer of data is very convenient and is becoming increasingly popular.

It should be noted that USB devices that do not conform to accepted standards ("non-compliant USB devices") can always draw current from a USB connector that has power on its $V_{Bus}$ contact. However, there is strong and increasing desire for USB devices to be compliant with USB standards. For example, USBIF rules specify that a USB device (one type of "compliant USB device") can only draw current from a computer when the computer is in an active mode and gives its permission. For example, some laptops will not allow charging through a USB connector if it is running solely on battery power. This means that if a laptop computer is in an inactive mode the USB device cannot be charged through the laptop's USB connector because it cannot communicate with the compliant USB device. Instead, the USB device can be charged by a dedicated USB charger ("dedicated charger") which is essentially a power adapter with an AC input and a USB connector output. The dedicated charger has an identification protocol which lets a USB device know that it is connected to dedicated charger.

For example, an iPhone® smart phone from Apple, Inc. can be coupled to some PC-based laptop computers for charging through a USB connector port while the computer is operating in an S0 state. Typically, the iPhone will charge at a maximum rate of about 500 mA to prevent too much current being drawn from the laptop computer while it is operating. However, with many such laptop computers, if the computer goes into a standby (S3) or hibernate (S4) mode the iPhone will stop charging. With such systems, the iPhone can be disconnected from the computer and a mouse, keyboard, or other "remote wake-up" device can be connected to the USB connector port in order to "wake-up" the computer.

As used herein, a "USB remote wake-up device" is a device, such as mouse or keyboard, which can be coupled to a USB connector port and which can send a "wake-up" signal or command to the system (e.g. the laptop computer). The form of the command or signal can vary, e.g. in the case of a mouse it can be a "click" of a button, and in the case of a keyboard it can be the pressing of a key. It should be noted that, while USB remote wake-up devices can be of various types, they typically only draw enough power for their own operation and they tend to be low speed devices.

Some laptop computers have the ability to charge USB devices even when they are in a "sleep" state (e.g. S3 and/or S4 states). In fact, the rate of charging can increase during these modes because the computer system does not require the power. For example, a laptop computer provided with a MAX14550 USB host charger device allows a USB device to charge at about 500 mA during the computer's S0 state and at about 900 mA during the computer's S3 state.

While having certain advantages, prior systems which allow USB devices to charge in a standby mode tend to disable remote wake-up, i.e. the ability to unplug the USB device, plug in a "wake-up" peripheral such as a keyboard or mouse, and to wake-up the computer so that it is again in an S0 state.

These and other limitations of the prior art will become apparent to those of skill in the art upon a reading of the following descriptions and a study of the several figures of the drawing.

SUMMARY

By way of example and not limitation, an apparatus for remote wake-up during dedicated charging mode includes: a USB transceiver port; a USB connector port; a switch network coupling the USB transceiver port to the USB connector port; and control logic coupled to the switch network and operative to control the switch network to disconnect the USB transceiver port from the USB connector port during a dedicated charger operational mode and to connect the USB transceiver port to the USB connector port upon the detection of a potential remote wake-up condition.

By way of further example and not limitation, a method for remote wake-up during dedicated charging mode includes: monitoring a USB connector port for a signature of a device coupled to the USB connector port; connecting the USB connector port to a biasing circuit upon a detection of a USB device coupled to the USB connector for dedicated charging; and connecting the USB connector port to a USB transceiver port upon a detection of a USB remote wake-up device coupled to the USB connector port.

By way of still further example and not limitation, a method for remote wake-up during dedicated charging mode includes: detecting the coupling of a device to a USB connector port; determining a type of the device; decoupling the USB connector port from a USB transceiver port if the device is a USB device to be charged; and coupling the USB connector port to the USB transceiver port if the device is a USB remote wake-up device.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTIONS OF EXAMPLE EMBODIMENTS

Figure 1:
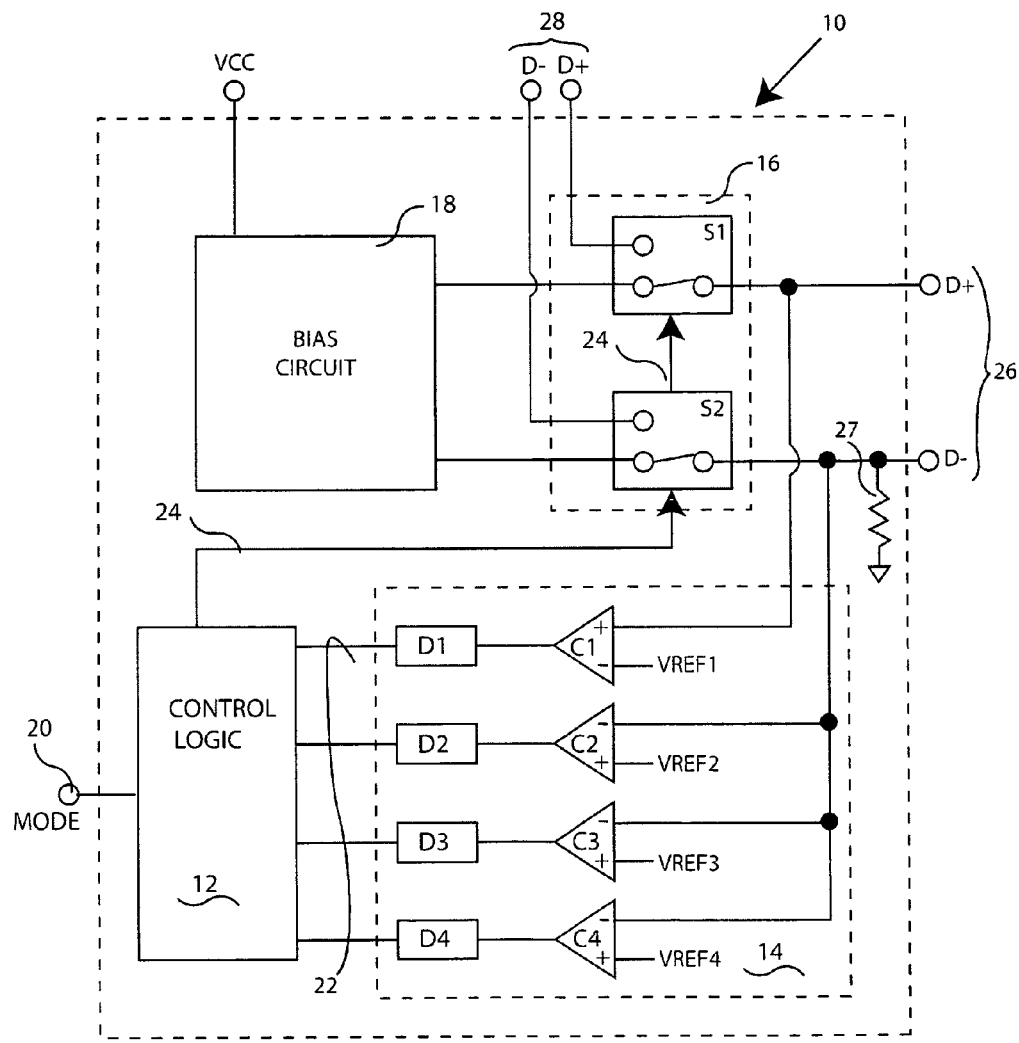
FIG. 1 is a block diagram of an example apparatus for remote wake-up during dedicated charging mode.

FIG. 1 is a block diagram of an example apparatus 10 for remote wake-up during dedicated charging mode including control logic 12, USB signature detector 14, switch network 16 and bias circuit 18. As will be appreciated by those of skill in the art, apparatus 10 may be made from discrete components or may be integrated as part or all of an integrated circuit (IC).

Control logic 12 can take various forms, as will be appreciated by those of skill in the art. For example, control logic 12 can be a microprocessor, microcontroller, gate array, state machine, etc. In a non-limiting embodiment, the behavior of the control logic 12 can be implemented using Real Time Language (RTL) or other languages that can be used for the behavioral design of circuitry. Control logic 12 includes, as inputs, a mode line 20 to determine the operating state of the system and a bus 22 from the USB signature detector 14. Control logic also has a control bus 24 coupled to the switch network 16.

Signature detector 14, by way of non-limiting example, may include a comparator C1, a comparator C2, a comparator C3, a comparator C4, a debouncer D1, a debouncer D2, a debouncer D3 and a debouncer D4. A positive input of comparator C1 is coupled to a D+ line of a USB connector port 26 and its negative input is coupled to a reference voltage $V_{REF1}$. A negative input, of comparator C2 is coupled to a D− line of USB connector port 26 and its positive input is coupled to a reference voltage $V_{REF2}$. A negative input of comparator C3 is coupled to the D− line of USB connector port 26 and its positive input is coupled to a reference voltage $V_{REF3}$. A negative input of comparator C4 is coupled to the D− line of USB connector port 26 and its positive input is coupled to a reference voltage $V_{REF4}$. A bias resistor 27 coupled the D− line of USB connector port 26 to ground. Debouncers D1-D4 couple the outputs of comparators C1-C4, respectively, to digital bus 22.

It will be appreciated that the design and component values of the signature detector 14 can have some variance depending up the device signatures to be detected. By way of non-limiting example, resistor 27 can be approximately 500 kΩ. By further non-limiting examples, $V_{REF1}$ can be approximate 58% of Vcc, $V_{REF2}$ can be approximately 46% of Vcc, $V_{REF3}$ can be approximately 7% of Vcc, and $V_{REF4}$ can be approximately 58% of Vcc. By still further non-limiting example, debouncer D1 can be an approximately 1.0 ms debouncer, debouncer D2 can be an approximately 6.5 ms debouncer, debouncer D3 can be an approximately 1.5 ms debouncer, and debouncer D4 can be an approximately 1.0 ms debouncer. With this configuration, the signature detector 14 can detect the signature of many common devices and can therefore be used to differentiate between USB devices to be charged and USB remote wake-up devices.

Switch network 16, in this non-limiting example, includes electronic switches S1 and S2 which are ganged together to form the equivalent of a double-pole double, throw (DPDT) switch. The switch network 16 can be controlled by the control bus 24 of control logic 12. The switch network, in this non-limiting example, can couple the USB connector port 26 either to a USB transceiver ("USB XCVR") port 28 or to bias circuit 18, which provides a bias current for the data lines D+, D− of the USB connector port 26 when the apparatus 10 is in a dedicated charging mode.

Example operations of apparatus 10 are as follows. Should apparatus 10 be in an S0 state, the switching network 16 coupled the USB connector port 26 to the USB XCVR port 28. The USB XCVR and a USB device coupled to the USB connector port 26 then communicate in the normal fashion. This may sometimes be referred to as a "pass-through" mode for apparatus 10. Should the apparatus 10 be in a dedicated charging mode, the switching network 16 couples the bias circuit 18 to the data lines D+, D− of the USB connector port 26.

Control logic 12 monitors the D+ and D− lines of the USB connector port 26 for devices being coupled or uncoupled to the USB connector port 26. By way of non-limiting example, this can be accomplished by signature detector 14 which detects a "signature" of a USB device. For example, devices that are to be only charged through the USB connector port 26 ("USB devices") have distinctive signatures that distinguish them from other types of devices that will be sending data through the USB connector port 26, such as keyboards and mice ("USB remote wake-up devices").

Part of the functionality of the control logic 12, in this non-limiting example, may be to detect when a USB remote wake-up device is coupled to the USB connector port 26 and to control the switch network 16 so that a wake-up signal can be processed by a USB transceiver coupled to the USB XCVR port 28. Also by way of further examples, the control logic 12 can be used to detect when a USB remote wake-up device is no longer coupled to the USB connector port 26 and/or when a USB device is coupled to the USB connector port 26.

Figure 2:
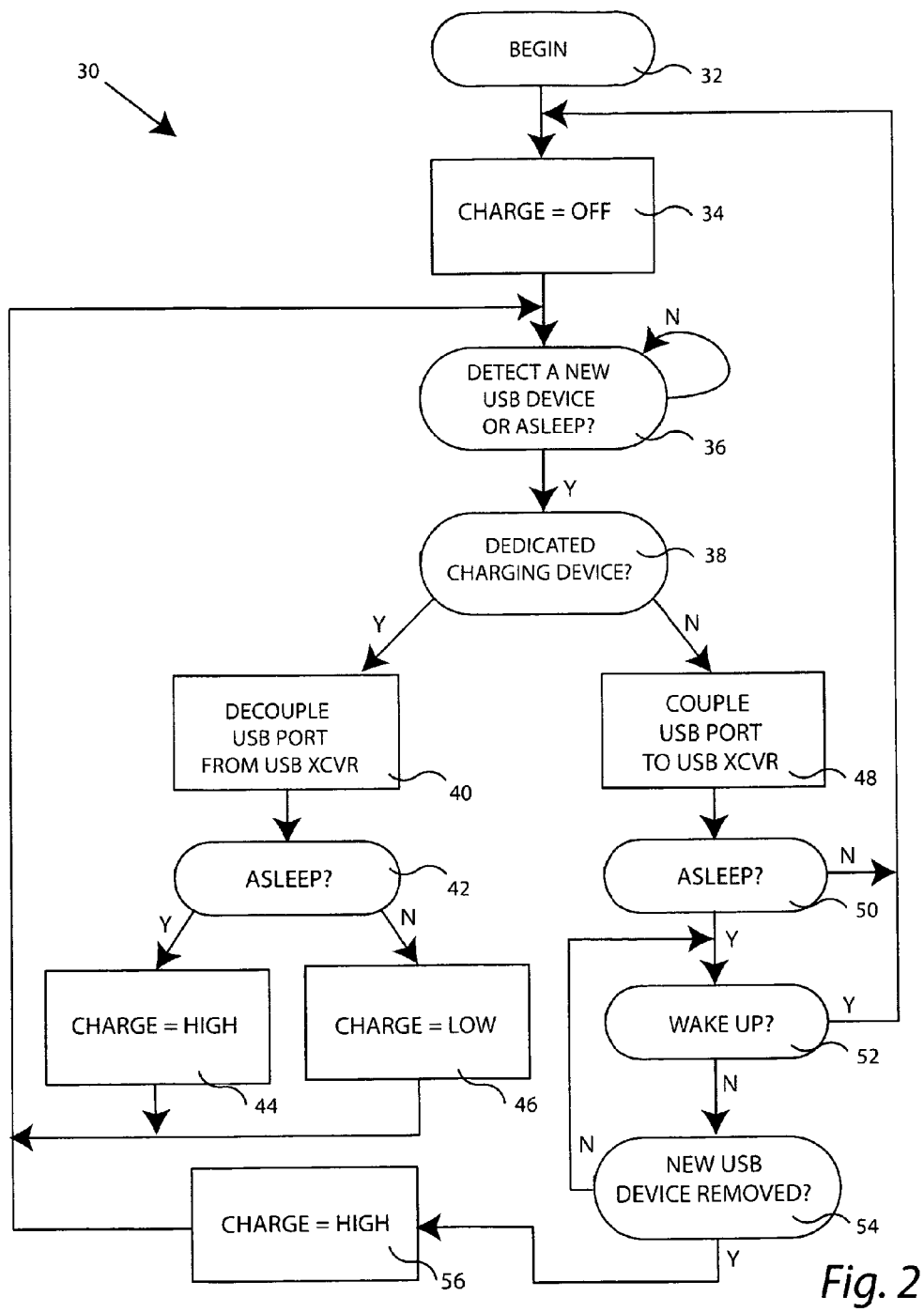
FIG. 2 is a flow diagram of an example process for remote wake-up during dedicated charging mode.

FIG. 2 is a flow diagram of an example process 30 for remote wake-up during dedicated charging mode. The process 30 may be implemented, by way of non-limiting example, at least in part in the control logic 12 of the apparatus 10.

Example process 30 begins at 32, such as with the power-up of the system, and defaults into a CHARGE=OFF mode in an operation 34. Next, in a decision operation 36, it is determined whether a new USB device is detected, such as at USB connector port 26 of FIG. 1, or if the system has entered a sleep mode. If not, the process 30 idles at operation 36 until a new USB device is detected or until the system goes into a sleep mode.

Once a new USB device is detected, an operation 38 determines whether it is a USB device (e.g. a cellular telephone) or a USB remote wake up device (e.g. a mouse). If it is a USB device, an operation 40 decouples the USB connector port 26 from the USB XCVR port 28 by, for example, operating the switching network 16. Next, in an operation 42, it is determined if the system is "asleep", e.g. in one of the sleep modes S3 or 34 for a personal computer. If the system is asleep, the rate of charging can be high as indicated by the CHARGE=HIGH operation 44. If the system in not asleep, e.g. it is in a normal operating or S0 state, then the rate of charging is lower, as indicated by the CHARGE=LOW operation 46, so as not to draw too much current from the system. The process flow then returns to operation 36.

If operation 38 determines that a USB remote wake up device has been coupled to the USB connector port 26, an operation 48 couples the USB connector port 26 to the USB XCVR port 28. Next, in a decision operation 50, it is determined if the system is asleep. If not, process control returns to operation 34 and the apparatus 10 operates as a pass-through between the USB XCVR port 28 and the USB connector port 26. If, however, the system is asleep, an operation 52 determines whether a "wake-up" command has been sent by the USB remote wake-up device. An example of a "wake-up" command would be a mouse click or a button press on a keyboard or other USB remote wake-up device. If there is a wake-up command detected, operational control again returns to operation 34.

If, operation 52 does not detect a wake-up signal, an operation 54 determines if the new USB device detected by operation 36 has been removed. If not, process control returns to operation 52. If so, the CHARGE=HIGH is set by operation 56 (since the system is still asleep and the new, USB remote wake-up device has been removed) and process control is returned to operation 36.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An apparatus for remote wake-up during dedicated charging mode comprising:
    a USB transceiver port;
    a USB connector port;
    a switch network selectively coupling said USB transceiver port to said USB connector port;
    control logic coupled to said switch network and operative to control said switch network to disconnect said USB transceiver port from said USB connector port during a dedicated charger operational mode and to connect said USB transceiver port to said USB connector port upon detection of a potential remote wake-up condition to exit a sleep, standby or hibernate mode when a USB remote wake-up device is connected to said USB connector port; and
    signature detection circuitry between said USB connector port and said control logic to differentiate between USB devices to be charged and USB remote wake-up devices, said signature detection circuitry including a plurality of series connections of a comparator and a debouncer comprising
        (a) a first comparator having a positive input coupled to a D+ line of said USB connector port, a negative input coupled to a first reference voltage, and an output coupled to an input of a first debouncer, said first debouncer having an output,
        (b) a second comparator having a negative input coupled to a D− line of said USB connector port, a positive input coupled to a second reference voltage, and an output coupled to an input of a second debouncer, said second debouncer having an output,
        (c) a third comparator having a negative input coupled to said D− line of said USB connector port, a positive input coupled to a third reference voltage, and an output coupled to an input of a third debouncer, said third debouncer having an output,
        (d) a fourth comparator having a negative input coupled to said D− line of said USB connector port, a positive input coupled to a fourth reference voltage, and an output coupled to an input of a fourth debouncer, said fourth debouncer having an output, and
        (e) a bias resistor coupled between said D− line of USB connector port and ground.

2. An apparatus for remote wake-up during dedicated charging mode as recited in claim 1 wherein said switch network, in a first position, couples a D+ line and a D− line of said USB transceiver port to a D+ line and a D− line of said USB connector port.

3. An apparatus for remote wake-up during dedicated charging mode as recited in claim 2 wherein said switch network, in a second position, couples said D+ line and said D− line of said USB connector port to a bias circuit.

4. An apparatus for remote wake-up during dedicated charging mode as recited in claim 1 wherein said USB transceiver port, said USB connector port, said switch network, said control logic and said signature detection circuitry form a part of an integrated circuit chip.

5. An apparatus for remote wake-up during dedicated charging mode as recited in claim 1 further comprising a mode line to couple an external system to the control logic, wherein the control logic determines an operating state of the system.

6. An apparatus for remote wake-up during dedicated charging mode as recited in claim 5 wherein said operating state of the system is one of an active state and an inactive state comprising the sleep, standby or hibernate mode.

7. An apparatus for remote wake-up during dedicated charging mode as recited in claim 5 wherein said operating state of the system is one of an S0 operating state, an S3 operating state and an S4 operating state.

8. An apparatus for remote wake-up during dedicated charging mode as recited in claim 1 further comprising a bus to couple the signature detection circuitry to said control logic.

9. An apparatus for remote wake-up during dedicated charging mode as recited in claim 1 wherein said first reference voltage is approximately 58% of a circuit supply voltage (Vcc), said second reference voltage is approximately 46% of Vcc, said third reference voltage is approximately 7% of Vcc, and said fourth reference voltage is approximately 58% of Vcc and wherein said first debouncer is an approximately 1.0 ms debouncer, said second debouncer is an approximately 6.5 ms debouncer, said third debouncer is an approximately 1.5 ms debouncer, and said fourth debouncer is an approximately 1.0 ms debouncer and wherein said bias resistor is an approximately 500 kΩ resistor.

10. An apparatus for remote wake-up during dedicated charging mode as recited in claim 1 further comprising a bus to couple said outputs of said debouncers to said control logic.

11. An apparatus for remote wake-up during dedicated charging mode as recited in claim 1 wherein said switch network comprises a plurality of electronic switches configured as a double pole, double throw switch.

* * * * *